(12) United States Patent
Senatori

(10) Patent No.: US 8,709,140 B2
(45) Date of Patent: Apr. 29, 2014

(54) PARTICULATE REMOVAL

(75) Inventor: Mark David Senatori, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 328 days.

(21) Appl. No.: 13/074,765

(22) Filed: Mar. 29, 2011

(65) Prior Publication Data

US 2012/0247325 A1     Oct. 4, 2012

(51) Int. Cl.
*B01D 46/00*     (2006.01)

(52) U.S. Cl.
USPC .............. 96/425; 55/295; 55/385.6; 55/430

(58) Field of Classification Search
USPC ............ 55/282–305, 385.1–385.8; 95/23, 26, 95/282; 96/425
See application file for complete search history.

(56) References Cited

U.S. PATENT DOCUMENTS

| 2,716,494 | A | * | 8/1955 | Hursh | 210/396 |
| 3,221,479 | A | * | 12/1965 | Moser et al. | 55/296 |
| 4,233,040 | A | * | 11/1980 | Vogelaar et al. | 55/282.5 |
| 4,700,492 | A | * | 10/1987 | Werner et al. | 34/403 |
| 4,857,090 | A | * | 8/1989 | Hartness | 62/91 |
| 4,943,009 | A | * | 7/1990 | Gerstner-Stevens et al. | 242/472.8 |
| 4,971,026 | A | * | 11/1990 | Fineblum | 126/110 R |
| 5,217,512 | A | * | 6/1993 | Williams | 96/425 |
| 6,657,349 | B2 | * | 12/2003 | Fukushima | 310/156.47 |
| 2002/0088208 | A1 | * | 7/2002 | Lukac et al. | 55/289 |
| 2006/0070358 | A1 | * | 4/2006 | Oda et al. | 55/295 |
| 2009/0016019 | A1 | | 1/2009 | Bandholz et al. | |
| 2009/0272404 | A1 | | 11/2009 | Kim | |
| 2010/0006126 | A1 | | 1/2010 | Herring et al. | |
| 2011/0120066 | A1 | * | 5/2011 | Sakashita | 55/282.2 |

FOREIGN PATENT DOCUMENTS

CN     2460031     11/2001

* cited by examiner

*Primary Examiner* — Duane Smith
*Assistant Examiner* — Thomas McKenzie

(57) ABSTRACT

Embodiments provide methods, apparatuses, and articles of manufacture for filtering particulates from an airflow directed at a heat exchanger. A blade may gather the filtered particulates. The gathered particulates may then be exhausted.

7 Claims, 4 Drawing Sheets

PARTICULATE REMOVAL

BACKGROUND

Typically, computer systems utilize airflow through external vents to cool internal components. Fans are generally used to generate the airflow. To increase the efficiency of the cooling effect, a heat exchanger may be disposed in a path of the airflow. A heat exchanger includes thermally conductive elements that may be coupled to relatively high heat components. The thermally conductive elements may increase a surface area over which the airflow passes, thereby cooling the components.

DETAILED DESCRIPTION

Computing systems rely on, among other things, airflow through external vents for cooling. The airflow may be generated by fans and directed toward heat sinks or heat exchangers to increase their cooling effect. The airflow is generally directed from a vent, which acts as an intake, through the heat exchanger, and exhausted through another vent, which acts as an exhaust. While generating the airflow, dust and debris may enter the system. This dust and debris may be directed, along with the airflow, toward the heat exchanger. If the dust or debris is larger than an opening of the heat exchanger, it may become clogged. As the airflow continues to be directed toward the heat exchanger, more debris and dust may become lodged, which may eventually retard the airflow.

In the present disclosure, methods, systems, and articles of manufacture are disclosed that enable the system to gather and exhaust debris included in an airstream directed through a heat exchanger. In this manner, the system may exhaust debris that would otherwise impede airflow and its cooling effect.

Figure 1:
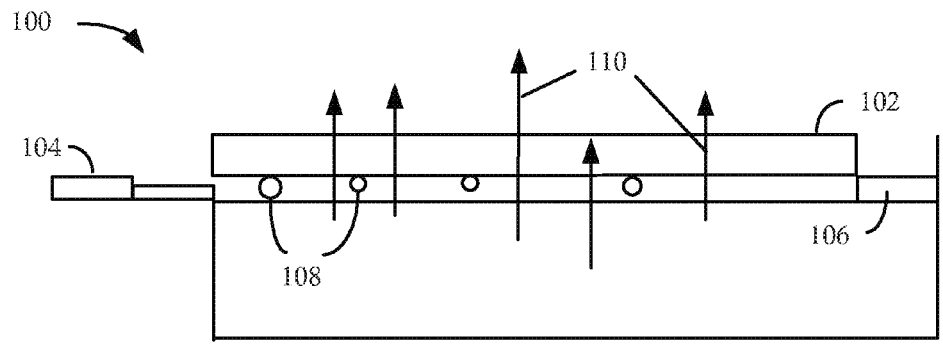
FIG. 1 is an elevational diagram of a system in accordance with an embodiment.

Referring to FIG. 1, an example system is illustrated. The system 100 includes a filter 102, a blade 104, and a latch 106. As illustrated, an airflow 110 is directed through the filter 102. Within the airflow 110 is debris 108 that is removed from the airflow 110 by filter 102.

A filter 102 is a component configured to remove or filter debris 108 from an airflow 110. The filter may utilize materials ranging from metal to plastic, and have various configurations. In one example, the filter may comprise an interleaving pattern of wires. In another example, the filter may comprise a substantially flat material having multiple openings disposed in an array-like manner. In either the first example or the second example, the openings may have a size that is configured to remove debris that would otherwise become clogged within the system. For example, the openings may have a size smaller than a size of an opening associated with a heat exchanger. This size relationship may ensure that debris 108 that would otherwise become caught within a heat exchanger is removed from the airflow 110 by the filter 102.

A blade 104 is a device configured to engage a first side of the filter 102 and gather debris which has been removed from an airflow 110. The blade 104 may comprise materials including metal, plastic, and rubber. The blade 104 is configured to traverse the first side of the filter to gather particulates or debris removed from an airflow by the filter 102. To gather the particulates, the blade 104 moves from a first position (e.g. a starting position) across the filter 102 in a linear motion. Other motions are contemplated, for example, the blade may traverse across the filter 102 forming an arc.

Latch 106 may be a component configured to open and close in response to movement of the blade 104. The latch 106 may provide a cover to an exhaust where the particulates gathered by the blade 104 are expunged or blown out of the system. The latch 106 may be configured to open in response to the blade traversing the first side of filter to discharge removed particulates. To actuate the latch 106, the blade 104 may have a protrusion such that the latch 106 is actuated as the blade reaches a position at the end of the filter 102. The latch may be spring biased to ensure it remains in a closed position absent a force from either a blade or other mechanical influence.

Figure 2:
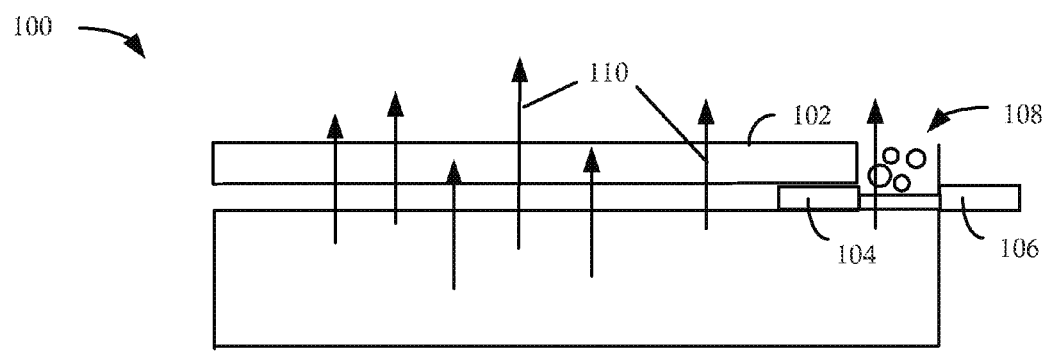
FIG. 2 is an elevational diagram of a system in accordance with an embodiment.

Referring now to FIG. 1 in conjunction with FIG. 2, an operation of the system is described in accordance with the present disclosure. Airflow 110 may be directed into a system for cooling purposes. The airflow 110 is generated by a fan which has an air intake. In generating the airflow, the fan may include particulates such as dust and debris in the airflow. These particulates 108 are removed from the airflow 110 by filter 102, as seen in FIG. 1.

As particulates 108 become trapped by filter 102, airflow 110 may begin to decrease. Blade 104 may then be actuated to gather the removed particulates. Blade 104 is disposed on a first side of the filter and is configured to traverse the first side of the filter to gather the removed particulates. The blade 104 moves from a first position or a start position to a second position or an end position. As the blade traverses the filter 102, a portion of the blade 104 may engage latch 106 to actuate the latch 106. As the blade 104 reaches the second position (as illustrated in FIG. 2), the latch 106 is opened revealing the exhaust chute where the particulates 108 may be evacuated. Because the latch 106 is moved to an open position, airflow 110 may additionally be allowed to flow through the exhaust chute. This airflow 110 may carry the particulates 108 out of the system 100.

Figure 3:
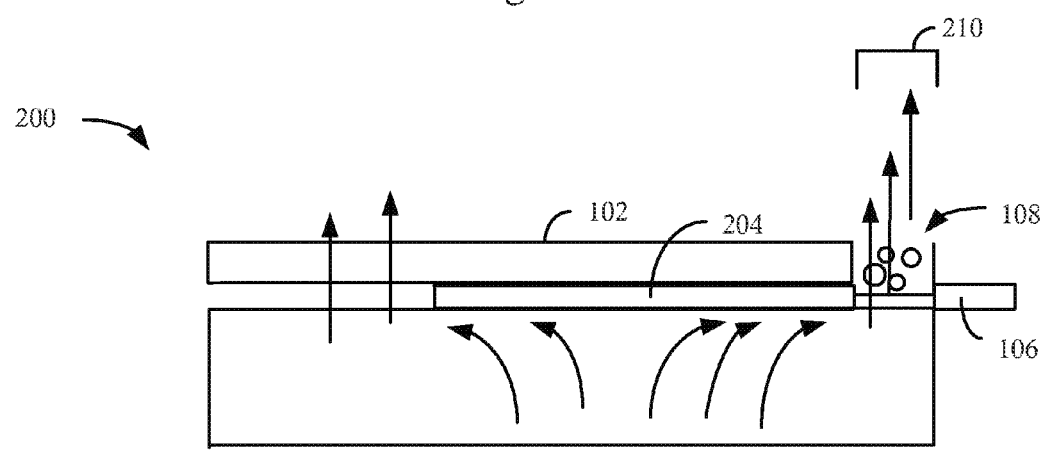
FIG. 3 is an elevational diagram of a system in accordance with an embodiment.

Referring to FIG. 3 another example is illustrated. In FIG. 3, system 200 includes similar components and functions in a generally similar manner as described with reference to FIGS. 1 and 2. System 200, however, includes a blade 204 which includes a larger body with respect to the blade 104 of FIGS. 1 and 2. When blade 204 is actuated to gather the removed particulates and engage latch 106 to open the exhaust chute, blade 204 additionally covers a majority of filter 102. This may have the effect of disrupting airflow through filter 102, thereby increasing the airflow 210 through the exhaust chute. This may increase the ability to exhaust particulates 108.

Figure 4:
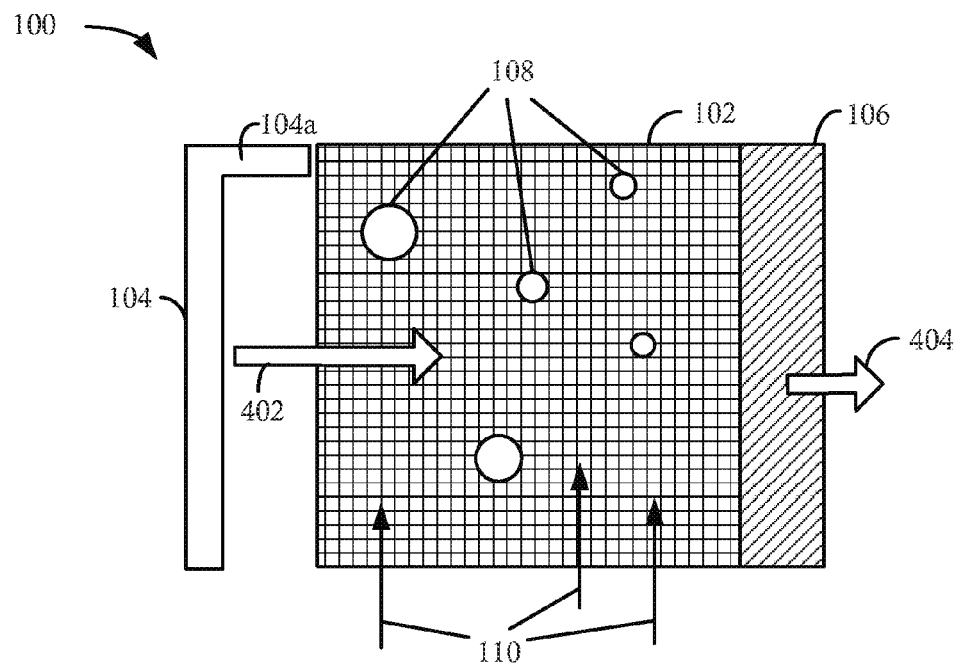
FIG. 4 is a side elevational view of a system in accordance with an embodiment.
Figure 5:
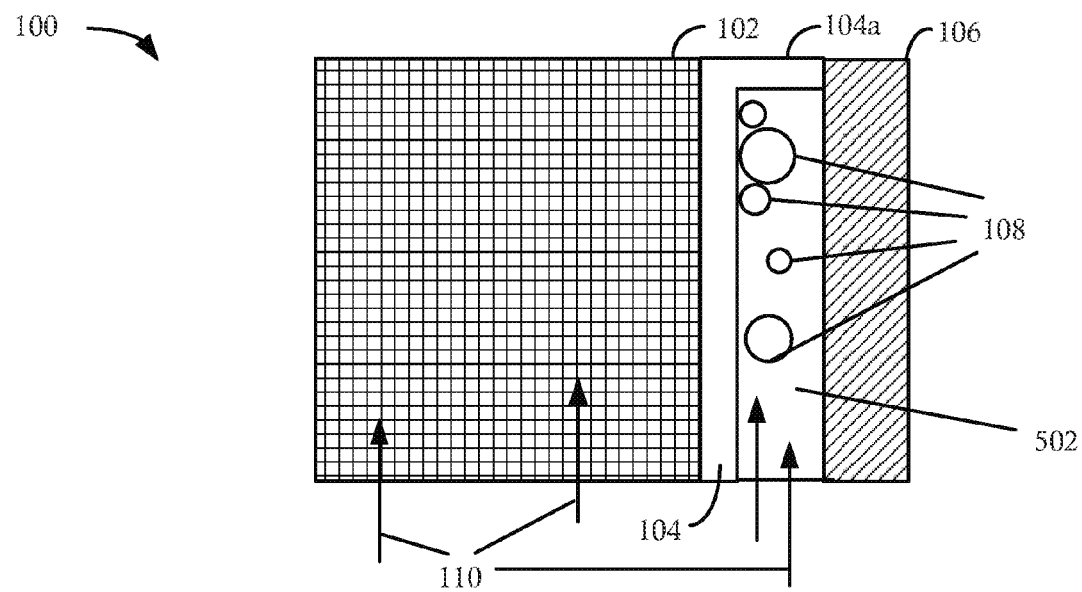
FIG. 5 is a side elevational view of a system in accordance with an embodiment.

Referring to FIGS. 4 and 5, another view of a system 100 is illustrated. FIGS. 4 and 5 illustrate side elevational views of filter 102, blade 104 and latch 106. As illustrated, airflow 110 is directed toward filter 102. Airflow 110 may include or direct particulates 108 along a generally similar path. Filter 102 is configured with a plurality of openings which are smaller than particulates 108, and consequently, particulates 108 are removed from airflow 110 as they engage filter 102.

Blade 104 includes a latch engaging portion 104a configured to actuate latch 106 as the blade 104 traverses the filter 102. The blade 104 is configured to move from a first position as illustrated in FIG. 4 to a second position as illustrated in FIG. 5. The blade 104 may move in a linear motion as indicated by arrow 402. As the blade traverses the filter 102, the latch engaging portion 104a may actuate latch 106. Latch 106 may be configured to open in a fashion indicated by arrow 404.

As the latch is actuated along arrow 404, an exhaust chute 502 is opened to facilitate evacuation or exhaust of particulates 108. When latch 106 is in an open position airflow 110 is permitted into the exhaust chute to exhaust the particulates. In various embodiments, blade 104 may have a shape configured to direct additional airflow into the exhaust chute to help evacuate the particulates 108.

In various other embodiments, latch 106 may be actuated by a mechanism other than blade 104. In one example, latch 106 may be mechanically coupled to various other members or components such that when blade 104 is actuated, latch 106 is similarly actuated.

Figure 6:
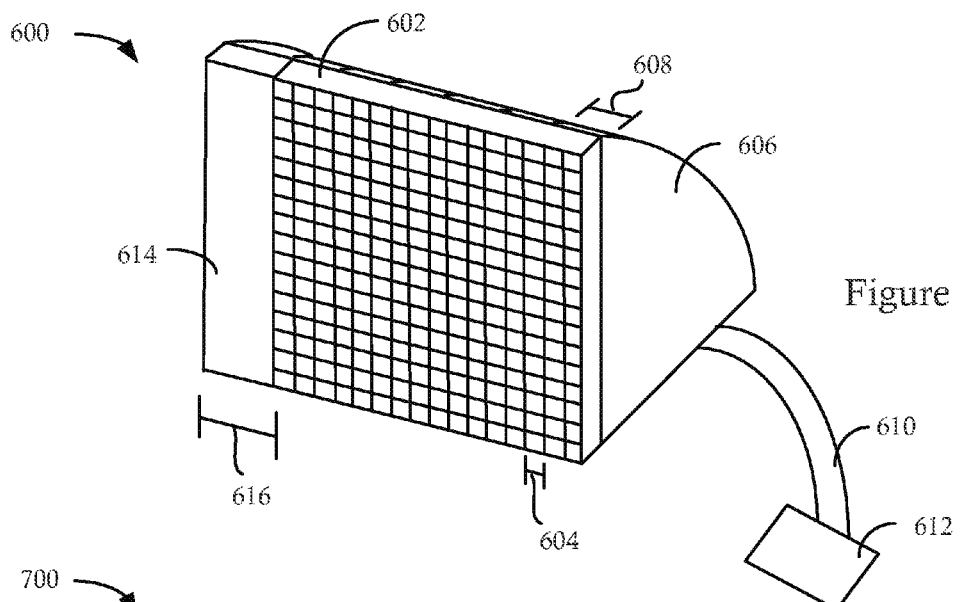
FIG. 6 is a perspective view of a system in accordance with an embodiment.

Referring to FIG. 6, a system 600 is illustrated in accordance with the present disclosure. The system 600 includes a filter 602, an exhaust chute 614, and a heat exchanger 606 are illustrated. The heat exchanger 606 is thermally coupled to a component 612 via a thermal conductor 610.

The filter 602 is configured to remove particulates from an airflow to prevent the particulates from becoming lodged in heat exchanger 606. To prevent particulates from becoming dogged in heat exchanger 606, the filter 602 is configured with openings have a size 604. The size 604 of the openings is less than the size 608 of the openings of the heat exchanger 606. In this manner, any particulates that are small enough to pass through the openings of the filter 602 are similarly likely to pass through the openings of heat exchanger 606.

The system 600 also illustrates an exhaust chute 614 having a width 616. The exhaust chute is configured to provide a pathway for the particulates to evacuate the system without becoming lodged in a heat exchanger or other component. The exhaust chute may include a latch configured to direct the airflow through the heat exchanger 606 and filter 602 when the evacuation of the system is not needed.

In one example, component 612 may be a high temperature component, such as a processor, central processing unit (CPU), application specific integrated circuit (ASIC), controller, or other component that draws high currents and voltages, and consequently, produces higher temperatures relative to other components. The component 612 may be thermally coupled to the heat exchanger 606 via a thermal conductor 610. The thermal conductor 610 may be a conductor configured to draw heat from component 612 and transmit heat to heat exchanger 606. Thermal conductor 610 may include conductive materials such as, cooper and gold.

Figure 7:
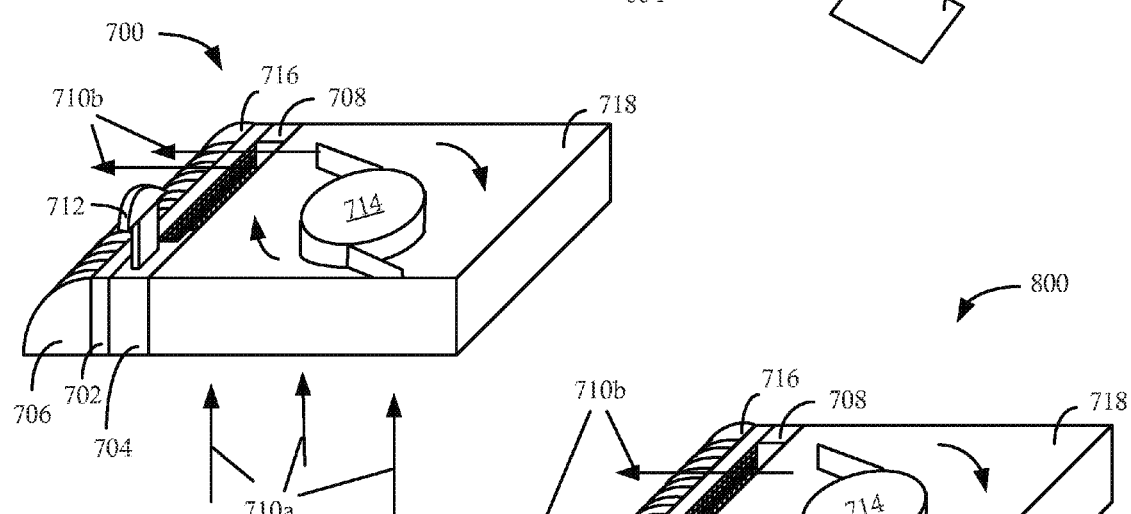
FIGS. 7-8 illustrate perspective views of systems in accordance with various embodiments.

Referring now to FIG. 7, a system is illustrated in accordance with the present disclosure. The system 700 includes a fan 714 in housing 718, a blade 704, a filter 702, a heat exchanger 706, and a latch 708 coupled to exhaust chute 716.

In the illustrated example, housing 718 is configured to house fan 714. The housing may include various wall structures that help generate and direct airflow. As fan 714 rotates air is drawn from below housing 718 illustrated by airflow 710a. Due to the structure of housing 718 and various characteristics of fan 714, airflow 710a is directed toward heat exchanger 706 along airflow path 710b. The use of housing 718 may increase airflow 710b by directly substantially increasing all airflow 710a in a similar direction.

Airflow 710a may include particulates such as dust and debris. Particulates may be filtered or removed from airflow 710b by filter 702. Filter 702 includes openings sized to prevent debris from becoming lodged or caught in the openings of heat exchanger 706. As particulates are removed by filter 702, airflow 710b may become reduced. The reduction may stern, at least in part, from the inability of fan 714 to force air through filter 702. This decrease in airflow 710b may impact the cooling of various components.

To detect a decrease in airflow 710b sensors may be utilized. In one example, a sensor may detect a decrease in a rotational speed of fan 714. As additional aft becomes trapped in housing 718, fan 714 may experience increased resistance to its ability to rotate. A sensor may determine this decrease in rotational speed. In another example, a sensor may detect a decrease in the airflow 710b. The sensor may be configured to monitor airflow into and out of the heat exchanger 706. Other sensors and manners of determining cooling efficiency are contemplated, for example, the use of thermistors or thermometers may measure temperatures associated with various components to determine whether there has been an increase or decrease in temperature.

In response to a decrease in airflow, system 700 may determine that particulates are impeding airflow 710b. The determination may alert a user of the decrease airflow 710b via a visual or audible alert. In response to alert, blade 704 may be actuated to gather removed particulates from the filter 702. To actuate blade 704, a lever 712 may be disposed on the outside of a computing system housing system 700. Lever 712 may include a variety of shapes and textures. The lever is coupled to the blade 704 and enables a user to actuate blade 704 from outside a housing or chassis of a computing system associated with system 700. When the lever 712 is actuated, blade 704 may traverse the filter 702. As blade 704 traverses the filter 702, a portion of blade 704 may actuate latch 708 to expose exhaust chute 716 to airflow 710b. The particulates are moved into exhaust chute 716 where they may be exhausted from system 700 and an associated computing system.

In another embodiment, a timer may be used to determine a proper period for actuating blade 704 to gather and evacuate particulates. The timer may have a predetermined period of time. In response to the expiration of the timer, a visual or audible alert may used to trigger actuation of blade 704.

Figure 8:
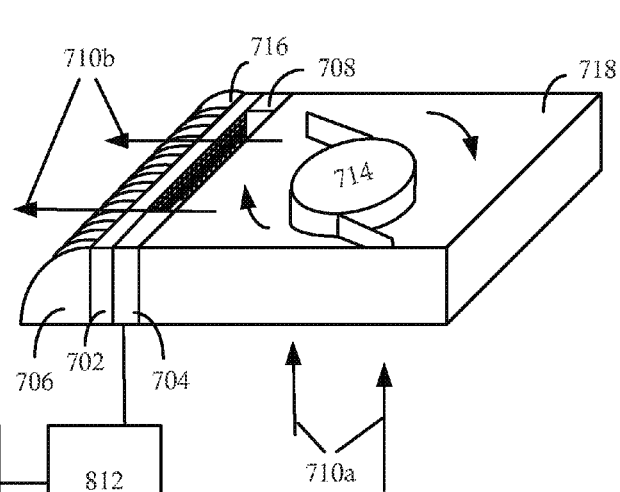

Referring now to FIG. 8, a system 800 is illustrated in accordance with the present disclosure. The system 800 is generally similar to system 700 discussed with reference to FIG. 7. In addition, system 800 includes a controller 814 coupled to a computer readable medium 816, and a servo 812 coupled to blade 704. A servo may be a motor or mechanical part configured to receive a signal and actuate blade 704. The servo 812 may be controlled by a controller or processor that monitors various characteristics of system 800.

In one example, controller 814 monitors airflow 710b and in response to a decrease in airflow 710b, transmits a signal to servo 812 to actuate blade 704 to gather and facilitate the evacuation of particulates via exhaust chute 716. In another example, controller 814 monitors a temperature of component coupled to system 800. In response to an increase in the temperature of the component, transmits a signal to servo 812 to actuate blade 704. In another embodiment, the controller 814 monitors a timer and upon expiration of the timer, transmits a signal to the servo 812 to actuate blade 704. In another example, the controller 814 monitors a rotational speed of a fan 714. In response to a decrease in a rotational speed of a fan 714, controller 814 transmits a signal to servo 812 to actuate blade 704. The controller 814 may be programmed via computer readable instructions stored on computer readable medium 816 to perform the monitoring in multiple combinations.

Figure 9:
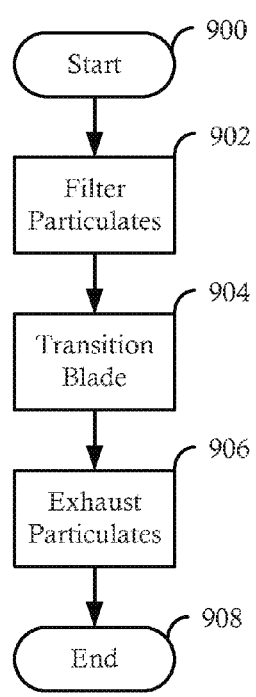
FIGS. 9-10 illustrate flow diagrams in accordance with various embodiments.
Figure 10:
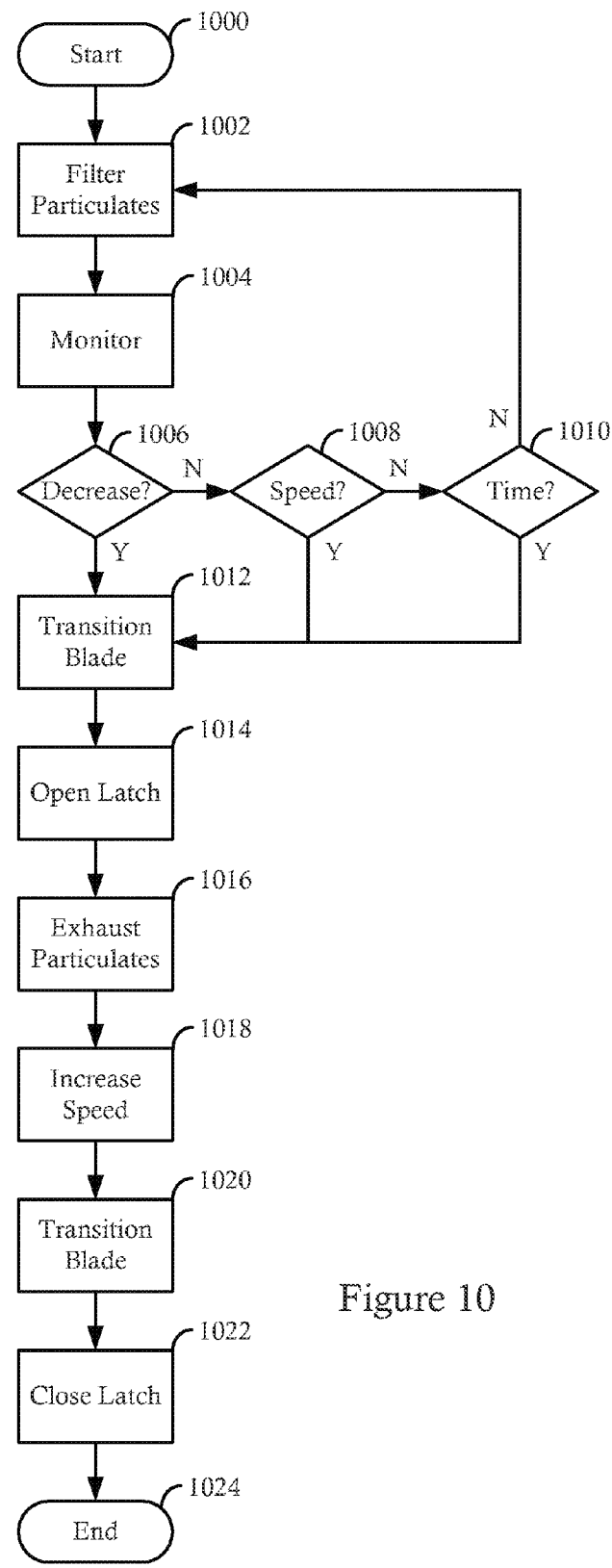

Referring to FIGS. 9-10 flow diagrams are illustrated in accordance with the present disclosure. The flow diagrams may illustrate methods which may be performed by the systems as described with reference to FIGS. 1-8. Additionally, the figures may illustrate the actions or operations performed by systems when executing computer readable instructions stored on computer readable mediums.

Referring to FIG. 9, the method may begin at 900 and progress to 902 where a filter may filter particulates from an airflow. Particulates may include dust, debris, or other items capable of lodging within components of the computing system. In response to the filtered particulates, the method may continue to 904 where a blade may transition from a first position to a second position. During the transition, the blade may gather removed particulates. As the blade transitions to the second position, the system may exhaust the particulates at 906. After exhausting the particulates, the method may end at 908.

Referring to FIG. 10, another flow diagram is illustrated in accordance with the present disclosure. The method may begin at 1000 and progress to 1002 where a filter, such as filter 102 removes particulates from an airflow. The airflow may be directed by a fan toward a heat exchanger. At 1004, the system may monitor various characteristics of the system. For example, a controller may monitor whether the airflow has decreased at 1006, whether a rotational speed of a fan generating the airflow has decreased at 1008, or whether a period of time has expired at 1010.

In response to a determination that the airflow has not decreased at 1006, and the speed of the fan has not decreased at 1008, and that a timer has not expired at 1010, the system may continue to filter particulates at 1002.

In response to a determination that the airflow has decreased at 1006, or the speed of the fan has decreased at 1008, or that a period of time has expired at 1010, the method may continue to 1012, where the blade is transitioned from a first position to a second position. The first position may be a start position and the second position may be an end position. In an example, the transition of the blade may be user initiated. In another example, the transition of the blade may be automated by a controller and a servo.

As the blade transitions to the second position the latch may be opened at 1014. Opening the latch may be in response to the blade contacting the latch, or alternatively, may merely be controlled by separate mechanics configured to open the latch in unison with the transition of the blade. In one example the latch may be spring loaded and the blade may impart a force that overcomes a spring constant of the spring and thus forces the latch to an open position.

With the latch open, the system may exhaust the particulates at 1016. Exhausting the particulates at 1016 may include increasing an airflow through an exhaust chute coupled to the latch. In one example, a rotational speed of a fan may additionally or alternatively be increased at 1018 to increase the airflow through the exhaust chute.

After the particulates have been exhausted, the blade may transition back to the first position for the second position at 1020. The system may determine that the particulates have been exhausted based on a timer. Upon expiration of a timer, the system may determine that the exhaust chute has been open for a period of time generally sufficient to exhaust the particulates. As the blade transitions from the second position to the first position, the latch may close at 1022. The latch may close in response to the blade relieving the force imparted on the spring of the latch, or alternatively, in response to the mechanics configured to open and close in unison with the actuation of the blade.

After the latch has closed, the method may end at 1024. Ending may include continued filtering and monitoring of various characteristics of the system. In addition, ending may also include a restart of a timer associated with the system, wherein the timer is configured to trigger the blade.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a wide variety of ways. This application is intended to cover any adaptations or variations of the embodiments discussed herein. Therefore, it is manifestly intended that embodiments be limited only by the claims and the equivalents thereof.

What is claimed is:

1. A system, comprising:
    a filter to remove particulates from an airflow directed toward a heat exchanger, wherein the heat exchanger is thermally coupled to a computing component;
    an exhaust chute through which particulates removed from the airflow by the filter may be evacuated;
    a latch having a latch-open position and a latch-closed position, said latch, when in said latch-open position, allowing particulates removed from the airflow into the exhaust chute, said latch, when in the latch-closed position, precluding particles removed from the airflow from entering the exhaust chute;
    a blade that is movable between a first blade position and a second blade position so as to move the latch into its latch-open position, the blade being shaped so that, when in the second blade position, said blade covers a majority of the filter and directs the airflow so that the airflow carries at least some of the particulates into the exhaust chute;
    a fan configured to generate the airflow; and
    the heat exchanger, the heat exchanger being disposed on a second side of the filter, wherein the airflow is directed through the heat exchanger while the blade is in the first blade position.

2. The system of claim 1, wherein the blade is further configured to return to a start position in response to the traversal of the first side of the filter.

3. The system of claim 2, wherein the latch is further configured to close in response to the return to the start position.

4. The system of claim 1, wherein the filter comprises an opening that is smaller than an opening of the heat exchanger.

5. The system of claim 1, further comprising:
    a lever coupled to the blade, wherein the lever is configured to actuate the blade.

6. The system of claim 1, further comprising:
    a servo coupled to the blade, wherein the servo is to actuate the blade in response to receipt of a signal.

7. The system of claim 1, further comprising:
    a sensor to determine whether the airflow through the heat exchanger has decreased.

* * * * *

UNITED STATES PATENT AND TRADEMARK OFFICE
CERTIFICATE OF CORRECTION

PATENT NO. : 8,709,140 B2
APPLICATION NO. : 13/074765
DATED : April 29, 2014
INVENTOR(S) : Senatori Page 1 of 1

It is certified that error appears in the above-identified patent and that said Letters Patent is hereby corrected as shown below:

In the Specification

Column 2, line 28, after "absent" insert -- of --.

Column 3, line 36, after "openings" insert -- that --.

Signed and Sealed this
Fifth Day of August, 2014

Michelle K. Lee
*Deputy Director of the United States Patent and Trademark Office*